US010705057B2

(12) United States Patent
Chen

(10) Patent No.: US 10,705,057 B2
(45) Date of Patent: Jul. 7, 2020

(54) PRECIOUS MATERIAL ANALYSIS USING VIBRATION SIGNATURE COMPARISON

(71) Applicant: Baxton Chen, San Marino, CA (US)

(72) Inventor: Baxton Chen, San Marino, CA (US)

(*) Notice: Subject to any disclaimer, the term of this patent is extended or adjusted under 35 U.S.C. 154(b) by 182 days.

(21) Appl. No.: 15/976,022

(22) Filed: May 10, 2018

(65) Prior Publication Data

US 2018/0259491 A1    Sep. 13, 2018

(51) Int. Cl.
  *G01N 29/44*  (2006.01)
  *G01N 29/12*  (2006.01)
  *G01N 29/42*  (2006.01)

(52) U.S. Cl.
  CPC ......... *G01N 29/4427* (2013.01); *G01N 29/12* (2013.01); *G01N 29/42* (2013.01); *G01N 29/4454* (2013.01); *G01N 2291/0232* (2013.01); *G01N 2291/2698* (2013.01)

(58) Field of Classification Search
  CPC .......................................... G01N 29/44–4436
  USPC .......................................................... 73/579
  See application file for complete search history.

(56) References Cited

U.S. PATENT DOCUMENTS

| 4,530,246 A | 7/1985 | Pitman et al. | |
| 2010/0089160 A1 | 4/2010 | Cosentino et al. | |
| 2014/0298911 A1* | 10/2014 | Rhodes | G01N 29/12 73/579 |
| 2015/0308983 A1* | 10/2015 | Eames | G01N 29/12 702/56 |
| 2016/0238486 A1 | 8/2016 | Bense et al. | |
| 2017/0052148 A1 | 2/2017 | Estevez et al. | |
| 2018/0246066 A1* | 8/2018 | Rhodes | G01N 29/12 |
| 2018/0364198 A1* | 12/2018 | Totoriello | G01N 29/043 |
| 2019/0302060 A1* | 10/2019 | Rhodes | G01N 29/4454 |
| 2020/0011837 A1* | 1/2020 | Rhodes | G01N 29/2437 |

OTHER PUBLICATIONS

Salazar, A. et al., "Ultrasonic Non-Destructive Testing of Archaeological Ceramics", In 9th European Conference on NDT, (Sep. 2006—Berlin (Germany)). Retrieved Jan. 3, 2019, from https://www.ndt.net/article/ecndt2006/doc/P124.pdf, 8 pages.

"Archaeologists recover Iron Age pottery at site in Welford", (Jul. 1, 2016). Retrieved Jan. 4, 2019, from https://le.ac.uk/news/2016/january/archaeologists-recover-iron-age-pottery-at-site-in-welford, 3 pages.

Non-Final Office Action, U.S. Appl. No. 15/644,303, dated Jan. 10, 2019.

* cited by examiner

*Primary Examiner* — Alexander A Mercado

(74) *Attorney, Agent, or Firm* — McDermott Will & Emery LLP

(57) ABSTRACT

A precious material analyzer may determine one or more characteristics of an unidentified precious material. A vibration injector may cause the unidentified precious material to vibrate with a vibration signature that is dependent on the one or more characteristics of the unidentified precious material. A vibration detector may detect and extract a vibration signature from the vibration of the unidentified precious material caused by the vibration injector. A vibration signature comparator may: compare the detected vibration signature of the unidentified precious material with vibration signatures of multiple identified precious materials having one or more identified characteristics; and flag one or more of the identified precious materials that have vibration signatures that are similar to the vibration signature of the unidentified precious material.

11 Claims, 4 Drawing Sheets

| Identified Precious Material Database ||||
| Image | Type | Owner | Vibration Signature |
|---|---|---|---|
| | Red ruby | Smithsonian | |
| ⋮ | ⋮ | ⋮ | ⋮ |
| | Blue Sapphire | Napolian | |

PRECIOUS MATERIAL ANALYSIS USING VIBRATION SIGNATURE COMPARISON

BACKGROUND

Technical Field

This disclosure relates to precious materials, such as gemstones and precious metals, including gold, silver, platinum, rhodium, iridium, and palladium, and to a determination of their authenticity and/or other characteristics about them.

Description of Related Art

The authenticity and/or other characteristics of precious materials, such as gemstones and precious metals, including gold, silver, platinum, rhodium, iridium, and palladium, is often in question. The authenticity and/or other characteristics of such precious materials is often determined by visual examination and/or testing, such reflective index testing, spectroscopy, specific gravity tests, or destructive processes, such as scratching, streaking, acid, and/or dye tests. The interpretation of these test results may require a high degree of expertise, adding to the cost and difficulties of such testing. The results of the testing may also not be conclusive, even to an expert, especially in view of improving technology for creating imitations, such as synthetic gems. The tests may also require cumbersome machines that are not mobile and thus may be inconvenient to use.

SUMMARY

A precious material analyzer may determine one or more characteristics of an unidentified precious material. A vibration injector may cause the unidentified precious material to vibrate with a vibration signature that is dependent on the one or more characteristics of the unidentified precious material. A vibration detector may detect and extract a vibration signature from the vibration of the unidentified precious material caused by the vibration injector. A vibration signature comparator may: compare the detected vibration signature of the unidentified precious material with vibration signatures of multiple identified precious materials having one or more identified characteristics; and flag one or more of the identified precious materials that have vibration signatures that are similar to the vibration signature of the unidentified precious material.

The vibration signature comparator may output at least one of the one or more characteristics of the flagged precious materials.

The vibration injector may include an ultrasound transmitter and the vibration detector may include an ultrasound receiver.

The vibration injector may cause the unidentified precious material to vibrate at multiple different frequencies, either simultaneously or sequentially. The vibration detector may detect the vibration signature of the unidentified pottery at each of the multiple different frequencies. The vibration signature comparator may: compare the detected vibration signature of the unidentified precious material at each of the multiple different frequencies with vibration signatures of the multiple identified precious materials at each of the multiple different frequencies; and flag at least one of the one or more of the identified precious materials that have vibration signatures at the multiple different frequencies that are each similar to the vibration signature of the unidentified precious material at the multiple different frequencies.

One of the characteristics may be information about a previous owner of the precious material.

One of the characteristics may be information about the type of the precious material.

The vibration signature comparator may use a correlation function to make the comparison.

The precious material analyzer may include a database of vibration signatures of the identified precious materials.

The vibration signatures of the unidentified and identified precious materials may be obtained under comparable conditions. One of the comparable conditions may be the separation distance between the vibration injector and the precious material.

The unidentified precious material may be a gemstone. The unidentified gemstone may be in a casing that may or may not have been removed prior to the injection of vibration by the vibration injector.

The unidentified precious material may be a precious metal.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION OF ILLUSTRATIVE EMBODIMENTS

Illustrative embodiments are now described. Other embodiments may be used in addition or instead. Details that may be apparent or unnecessary may be omitted to save space or for a more effective presentation. Some embodiments may be practiced with additional components or steps and/or without all of the components or steps that are described.

Figure 1:
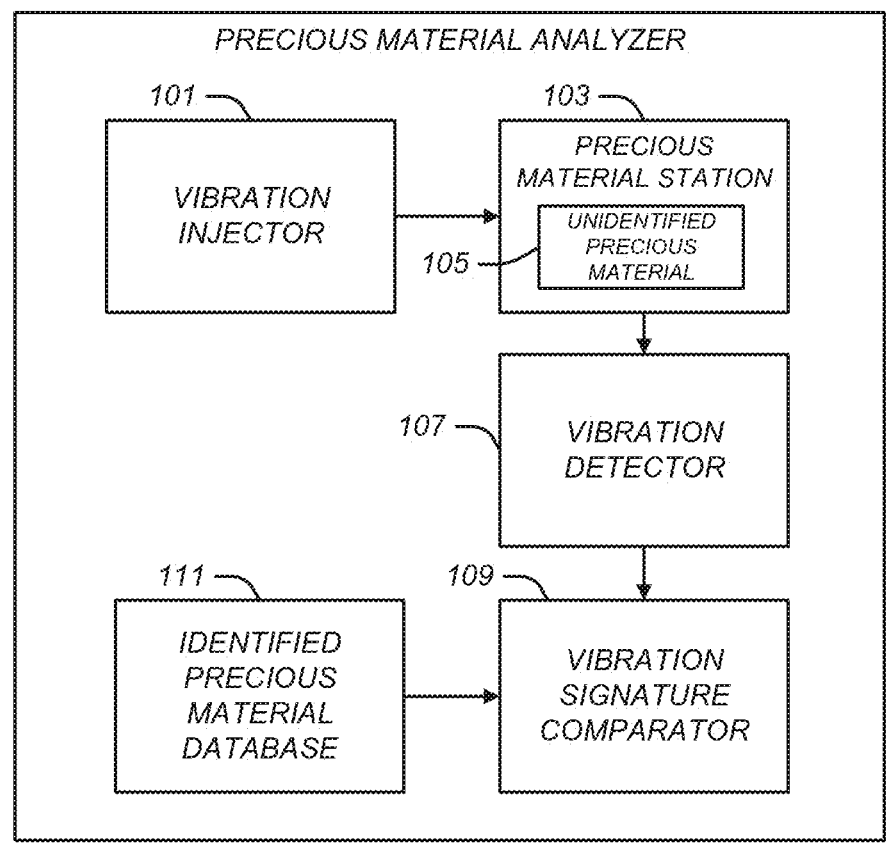
FIG. 1 illustrates an example of a precious material analyzer for determining the authenticity and/or other characteristic(s) about an unidentified precious material.

FIG. 1 illustrates an example of a precious material analyzer for determining the authenticity and/or other characteristic(s) about an unidentified precious material 105. As illustrated in FIG. 1, the precious material analyzer may include a vibration injector 101, a precious material station 103 for holding the unidentified precious material 105, a vibration detector 107, a vibration signature comparator 109, and an identified precious material database 111.

The vibration injector 101 may be of any type. For example, the vibration injector may be one that injects ultrasound (e.g., an ultrasound transducer), microwave (e.g., a magnetron), infrared (e.g., an infrared light source), electricity (e.g., electrodes and a source of high voltage), mechanical (a mechanical vibrator or an object striker), or various combinations and permutations of these types of vibration signals.

The vibration injector may be configured to inject different types of vibrations into the precious material, such as vibrations at different frequencies or having different waveshapes, and/or vibrations from different directions. The vibration injector 101 may be configured to injection these different types of vibrations and/or these vibrations from different directions either simultaneously, sequentially, or in any combination of these.

Figure 2:
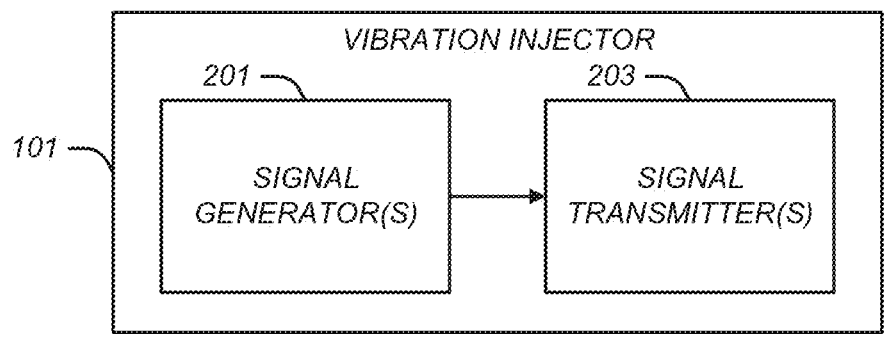
FIG. 2 illustrates an example of the vibration injector illustrated in FIG. 1.

FIG. 2 illustrates an example of the vibration injector 101 illustrated in FIG. 1 that generates and injects one or more vibration signals into the unidentified precious material 105. As illustrated in FIG. 2, the vibration injector 101 may include signal generator(s) 201 and signal transmitter(s) 203.

The signal generator(s) 201 may be any type of circuit or device that generates one or more vibration signals, simultaneously and/or sequentially. The vibration signal(s) may have any waveshape, such as a sinewave, square wave, sawtooth, or other waveshape. The signal generator 201 may be configured to generate the vibration signal at any frequency or sets of frequencies. For example, the frequency might vary from between 20 Hz to 20 MHz. One example of a machine that may be suitable is the General Electric Healthcare V-Scan Pocket Hand-Held Ultrasound Machine.

The signal generator(s) 201 may be portable or stationary. The signal generator(s) 201 may be a circuit dedicated to generating the desired signal(s) or a mobile or stationary general purpose computer programmed to generate the desired signal(s). A USB or other type of port may be used to deliver the generated signal(s) to the signal transmitter(s) 203.

The signal transmitter(s) 203 may be configured to generate the vibration signal(s) from the vibration signal(s) received from the signal generator(s) 201 that faithfully replicates the received signal(s) as a vibration wave or waves. The signal transmitter(s) 203 may be stationary or portable and may be configured to be held by hand or by a holding apparatus. The signal generator, for example, may be an ultrasound transducer, magnetron, infrared light source, one or more electrodes, and/or a mechanical vibrator or object striker. Another example that may be suitable is the General Electric Healthcare V-Scan Pocket Hand-Held Ultrasound Machine.

The signal transmitter(s) 203 may be configured to gently contact a surface of the unidentified precious material 105 to make it vibrate, and/or may be at a fixed separation distance from it. The signal transmitter(s) 203 may be configured to be held by a mechanical holding device, such as a plyers, clasp, ring, tape, or other adhesive.

The precious material station 103 may be configured to hold the unidentified precious material 105. The precious material station 103 may be of any type. For example, the precious material station may be a human hand, a platform, a stand with a clamp configured to clamp the unidentified precious material 105 firmly in place, but gently enough to ensure that it is not damaged. The precious material analyzer may be configured such that the vibration injector 101 and the unidentified precious material station 103 are maintained in a fixed relation to one another, thereby eliminating variations in the separation distance between the vibration injector 101 and the unidentified precious material 105.

The vibration detector 107 may be configured to detect a vibration signature from the unidentified precious material 105 while it is vibrating under the influence of the vibration injector 101. The phrase "vibration signature" means the signal emitted by the vibration of the unidentified precious material 105 during a fixed period of time, such as for a period of 10 ms, 100 ms, or 1 sec. The vibration signature may be a faithful reproduction of the vibration of the unidentified precious material 105 under the influence of the vibration injector 101 or a processed version of that signal that has undergone filtering and/or other types of signal alterations. The vibration signature may instead be a combination of vibration signals from the vibration detector 107 that are detected at different times in response to different types of vibrations that are injected by the vibration injector 101 at different times.

The vibration detector 107 may be positioned in a fixed relation with respect to the precious material station 103 so as to ensure that the separation distance between the unidentified precious material 105 and the vibration detector 107 is maintained constant. For example, the vibration detector 107 may be gently placed in contact with a surface of the unidentified precious material 105 or at a fixed distance therefrom. An example of the vibration detector may be a USB digital accelerometer. Another example may be to use an internal accelerometer that is inside of a smartphone.

Figures 3, 4:
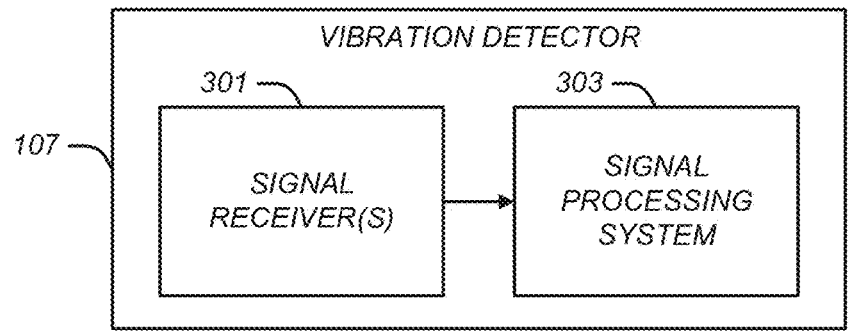
FIG. 3 illustrates an example of the vibration detector illustrated in FIG. 1.
FIG. 4 illustrates an example of the identified precious material database illustrated in FIG. 1.

FIG. 3 illustrates an example of the vibration detector 107 illustrated in FIG. 1 that detects vibration signatures. As illustrated in FIG. 3, the vibration detector 107 may include a signal receiver 301 and, optionally, a signal processing system 303 that may be configured to extract one or more signals of interest from the signal generated by the signal receiver 301 and/or to remove one or more signals that may not be of interest. The signal receiver 301 may be placed gently in contact with the unidentified precious material 105 or spaced a fixed distance from it.

A high speed, high resolution video camera may be used as the vibration detector 107, with post-capture-image processing that extracts the vibration signature from a series of video images. The vibration signal may be recorded by a recording device, like a mobile phone, and be played back later for analysis and interpretation. Other examples of vibration detectors that may be used for the vibration detector 107 include the VibroChecker Pro made by ACE Control Inc (Farmington, Mich.) or the SignalScope made by Faber Acoustical, LLC (Lehi, Utah).

The vibration detector 107 may include a digital or analog storage device that stores and indexes the vibration signature(s) that are detected.

One example of a machine that may be used for both the vibration injector 101 and the vibration detector 107 is the portable ultrasound machine by Onetech Medical Equipment Co, LTD, model number B19, 2017.

The vibration signature comparator 109 may be configured to compare vibration signatures detected by the vibration detector 107 from the unidentified precious material 105 with vibration signatures of multiple identified precious materials having one or more identified characteristics. The vibration signatures of the multiple identified precious materials may be contained in the identified precious material database 111.

The vibration signature comparator 109 may be implemented in whole or in part by a mobile or stationary computer connected to the vibration detector 107 with software that is configured to perform the functions that are described herein. The connection may be a wired connection, such as through a port, such as a USB port, and/or a wireless connection, such as a connection using Bluetooth or Wi-Fi.

The vibration signature comparator 109 may be configured to flag one or more of the identified precious materials in the identified precious material database 111 that have vibration signatures that are similar to a detected vibration signature(s) of the unidentified precious material 105.

Any algorithm may be used to determine when the vibration signature(s) of the unidentified precious material 105 is (are) similar to the vibration signature(s) of identified precious materials. When the vibration signature is a waveform, for example, the algorithm may analyze the waveform by using Forced Vibrational Analysis, which may include time analysis, amplitude analysis, dampening analysis, frequency analysis, or any combination of these. The analysis may be based on a single degree of freedom analysis, or multi degrees of freedom analysis. See also "*Basics of Structural Vibrational Testing and Analysis*," by Taylor, James and *The Vibration Analysis Handbook*. Vibration Consultants, 2$^{nd}$ Edition, 2003.

The vibration signature comparator 109 may include information about one more comparison thresholds that must be met in order for a comparison to result in an indication of a match.

An example of the vibration signature comparator 109 is the B&K Dactron Photon+ 4ch DC-84 KHz Dynamic Signal Analyzer and the PHOTON+DYNAMIC SIGNAL ANALYZER by Bruel & Kjaer." See also CoCo-80X Dynamic Signal Analyzer, Crystal Instruments, 2370 Owen Street, Santa Clara, Calif. 95054.

FIG. 4 illustrates an example of the identified precious material database illustrated in FIG. 1. As illustrated in FIG. 4, the identified precious material database may include a record for each of several different identified precious materials that have one or more identified characteristics. Although only two identified precious materials are illustrated in FIG. 4, it is to be understood that the identified precious material database may have many more, such as dozens, hundreds, or even thousands of identified precious materials.

Each identified precious material record in the identified precious material database may contain several different fields of information. For example, and as illustrated in FIG. 4, each record may contain information that identifies one or more characteristics of the identified precious material, such as an image of the identified precious material. The identification information may instead or in addition include a unique ID code for the identified precious material and/or other information about it, such as its type, owner identification information (e.g., name), weight, color, size, density, curvature, material, shape, and/or country of origin.

Each record may also contain one or more vibration signatures of the identified precious material. Each signature may be obtained under conditions that are identical or substantially the same as the conditions under which the vibration signature of the unidentified precious material 105 is obtained. One approach, for example, would be to obtain the vibration signatures of the identified precious materials using the same precious material analyzer that is used to obtain the vibration signature of the unidentified precious material 105, or an analyzer that is the same or substantially similar. This may eliminate variations in vibration signatures that are due to differences in the analyzers that are used.

The vibration signature(s) that is (are) stored in the identified precious material database 111 may be in any form. For example, they may be stored in the same form as the form of the vibration signature that is obtained for the unidentified precious material 105. That form may be a recorded analog signal or a digital file containing a digitized version of that analog signal. The vibration signatures of both the unidentified precious material 105 and the identified precious materials may instead first undergo various types of signal processing before they are compared, such as filtering. The vibration signature(s) may be either a continuous segment of the vibration or may be time-separated portions.

The records in the identified precious material database 111 may be supplemented with additional records about additional identified precious materials, following which an updated comparison may be made by the vibration signature comparator 109.

The identified precious material database 111 may be stored in any type of device, such as a hard disk drive, flash drive, CD, or DVR. The identified precious material database 111 may be at any location, i.e., not necessarily at the location of the other components of the precious material analyzer, such as in a server on the Internet that is accessible to the vibration signature comparator 109. The vibration signature comparator 109 may itself be stored at a location that is separate from other components of the part of shard analyzer, such as the same or a different server on the Internet.

The vibration signature comparator 109 may be configured to output an identification of the identified precious materials that have been determined to have similar vibration signatures, including the information in the database that identifies the identified precious material (e.g., its image and ID) and the identification information about that identified precious material, such as its owner and/or material type. If multiple matching identified precious materials are located, but the identified information about them is not identical, all of the variations in this identified information may also be outputted. The output may be in any form or forms, such as printed, displayed, or delivered to another computer.

The vibration signature comparator 109 may be configured to adjust the algorithm that is used to determine similarity between the vibration signature of the unidentified precious material 105 and the vibration signatures of the identified precious materials in the database 111. For example, adjustments may be made to make the determination of similarity more stringent or relaxed. An adjustment making the determination more stringent may be made when the number of matches is very large. Conversely, an adjustment making the determination more relaxed may be made when the number of matches is very small or none. These adjustments may be automatically made by the vibration signature comparator 109 based on the size of the matching signatures and/or any other criteria.

The vibration signature comparator 109 may be configured to automatically make adjustments to its comparison algorithm to compensate for apparent differences between the unidentified precious material 105 and each of the identified precious materials in the identified precious material database 111, such as differences in size, shape, and/or weight. Since the precious materials may be of different sizes, in order for the signatures to be comparable between different sizes of material of the same type, a standardized method of recording may be instituted. The recording may be taken at a standard distance from the vibration injection source, such as 1 cm. Multiple or single recordings may be taken, either simultaneously or sequentially.

The unidentified precious material that is being tested may have been previously tested and its vibration signature(s) may already be stored in the identified precious material database 111. In this case, the purpose of the comparison may be to verify that the unidentified precious material is, in fact, the same as the previously-tested precious material. This may facilitate verification of the authenticity of the tested precious material, e.g., that it is the very same precious material that was previously owned by someone else.

The unidentified precious material that is being tested may never have been previously tested. In this case, the purpose of the comparison may be to verify certain characteristics of the unidentified precious material, such as the type of the material and/or characteristics relating to the purity of the material. For example, a test of a precious metal may reveal that the precious material is merely a coating over a non-precious material and thus not as valuable as its outward appearance might suggest.

Figure 5A:
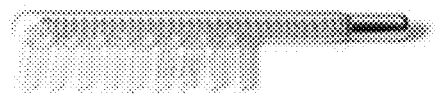
FIGS. 5A-5C illustrates an example of a precious material analyzer for determining the authenticity and/or other characteristic(s) of an unidentified precious material.
Figure 5B:
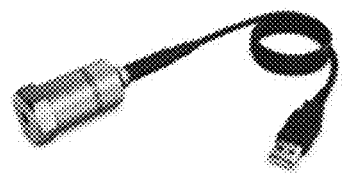
Figure 5C:
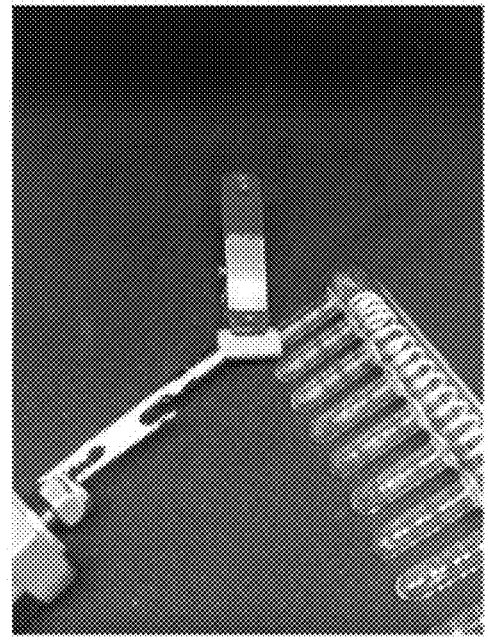

FIGS. 5A-5C illustrates an example of a precious material analyzer for determining the authenticity and/or other characteristics of an unidentified precious material. FIG. 5A illustrates an example of a high frequency energy device that may be used as part of the vibration injector 101. FIG. 5B illustrates an example of a USB digital accelerometer that may be used as part of the vibration detector 107. FIG. 5C illustrates a set up that may use the high frequency energy device illustrated in FIG. 5A and the USB digital accelerometer illustrated in FIG. 5B to vibration test a gemstone.

When testing a precious material, the precious material may be in a casing. The precious materials in the identified precious material database 111 that were in a casing may have been tested within or after having been separated from their casing. When the unidentified precious material is also in a casing, it may similarly be tested within or after have been separated from its casing. For optimum results, the identified and unidentified precious materials that were in a casings may either both be tested within or after having been separated from their casings, i.e., in the same way.

Figure 6:
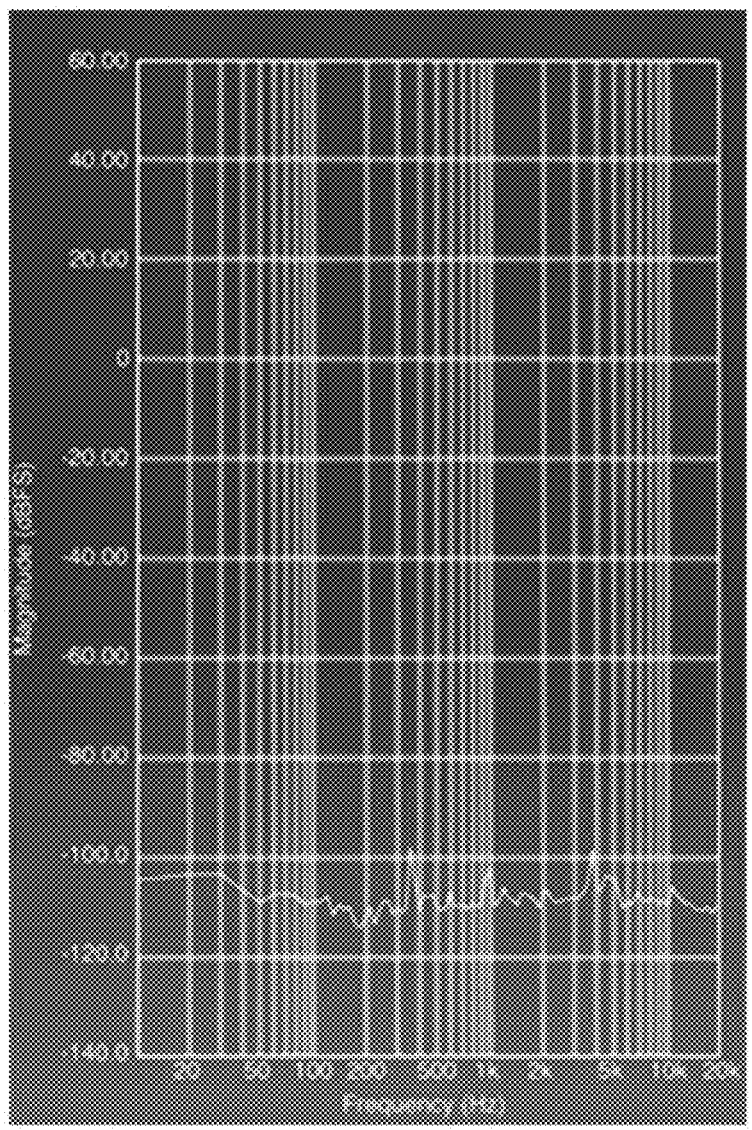
FIG. 6 illustrates an example of a vibration signature of a precious material.

FIG. 6 illustrates an example of a vibration signature of a precious material. As illustrated in this figure, the vibration signature spikes at about 4K, 1K, and 300 Hz, as well as low frequency broad vibration at around 30 Hz. Such frequency characteristics may be examined by the vibration signature comparator 109 when determining matches in the identified precious material database 111.

The components, steps, features, objects, benefits, and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits, and/or advantages. These also include embodiments in which the components and/or steps are arranged and/or ordered differently.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications that have been cited in this disclosure are incorporated herein by reference.

The phrase "means for" when used in a claim is intended to and should be interpreted to embrace the corresponding structures and materials that have been described and their equivalents. Similarly, the phrase "step for" when used in a claim is intended to and should be interpreted to embrace the corresponding acts that have been described and their equivalents. The absence of these phrases from a claim means that the claim is not intended to and should not be interpreted to be limited to these corresponding structures, materials, or acts, or to their equivalents.

The scope of protection is limited solely by the claims that now follow. That scope is intended and should be interpreted to be as broad as is consistent with the ordinary meaning of the language that is used in the claims when interpreted in light of this specification and the prosecution history that follows, except where specific meanings have been set forth, and to encompass all structural and functional equivalents.

Relational terms such as "first" and "second" and the like may be used solely to distinguish one entity or action from another, without necessarily requiring or implying any actual relationship or order between them. The terms "comprises," "comprising," and any other variation thereof when used in connection with a list of elements in the specification or claims are intended to indicate that the list is not exclusive and that other elements may be included. Similarly, an element proceeded by an "a" or an "an" does not, without further constraints, preclude the existence of additional elements of the identical type.

None of the claims are intended to embrace subject matter that fails to satisfy the requirement of Sections 101, 102, or 103 of the Patent Act, nor should they be interpreted in such a way. Any unintended coverage of such subject matter is hereby disclaimed. Except as just stated in this paragraph, nothing that has been stated or illustrated is intended or should be interpreted to cause a dedication of any component, step, feature, object, benefit, advantage, or equivalent to the public, regardless of whether it is or is not recited in the claims.

The abstract is provided to help the reader quickly ascertain the nature of the technical disclosure. It is submitted with the understanding that it will not be used to interpret or limit the scope or meaning of the claims. In addition, various features in the foregoing detailed description are grouped together in various embodiments to streamline the disclosure. This method of disclosure should not be interpreted as requiring claimed embodiments to require more features than are expressly recited in each claim. Rather, as the following claims reflect, inventive subject matter lies in less than all features of a single disclosed embodiment. Thus, the following claims are hereby incorporated into the detailed description, with each claim standing on its own as separately claimed subject matter.

The invention claimed is:

1. A precious material analyzer for determining one or more characteristics of an unidentified precious material comprising:
    a vibration injector that causes the unidentified precious material to vibrate with a vibration signature that is dependent on the one or more characteristics of the unidentified precious material;
    a vibration detector that detects and extracts the vibration signature from the vibration of the unidentified precious material caused by the vibration injector; and a vibration signature comparator that:
compares the detected vibration signature of the unidentified precious material with vibration signatures of multiple identified precious materials having one or more identified characteristics; and
flags one or more of the identified precious materials that have vibration signatures that match the vibration signature of the unidentified precious material,
wherein the unidentified precious material includes at least one selected from the group consisting of gemstones, gold, silver, platinum, rhodium, iridium, and palladium, and
wherein the vibration injector causes the unidentified precious material to vibrate simultaneously at multiple different frequencies;
the vibration detector detects the vibration signature of the unidentified precious material at each of the multiple different frequencies; and
the vibration signature comparator:
compares the detected vibration signature of the unidentified precious material at each of the multiple different frequencies with vibration signatures of the multiple identified precious materials at each of the multiple different frequencies; and
flags at least one of the one or more of the identified precious materials that have vibration signatures at the multiple different frequencies that match the vibration signature of the unidentified precious material at the multiple different frequencies.

2. The precious material analyzer of claim 1 wherein the vibration signature comparator outputs at least one of the one or more characteristics of the flagged precious materials.

3. The precious material analyzer of claim 1 wherein the vibration injector includes an ultrasound transmitter and the vibration detector include an ultrasound receiver.

4. The precious material analyzer of claim 1 wherein one of the characteristics is information about a previous owner of the precious material.

5. The precious material analyzer of claim 1 wherein one of the characteristics is information about the type of the precious material.

6. The precious material analyzer of claim 1 wherein the vibration signature comparator uses a correlation function to make the comparison.

7. The precious material analyzer of claim 1 further comprising a database of vibration signatures of the identified precious materials.

8. The precious material analyzer of claim 1 wherein the vibration signatures of the unidentified and identified precious materials are obtained under same conditions.

9. The precious material analyzer of claim 8 wherein one of the comparable conditions is a separation distance between the vibration injector and the precious material.

10. The precious material analyzer of claim 1 wherein the unidentified precious material is a gemstone.

11. The precious material analyzer of claim 1 wherein the unidentified precious material is a precious metal.

* * * * *